United States Patent
Christodorescu et al.

(10) Patent No.: US 10,152,465 B2
(45) Date of Patent: Dec. 11, 2018

(54) SECURITY-FOCUSED WEB APPLICATION CRAWLING

(71) Applicant: QUALCOMM Incorporated, San Diego, CA (US)

(72) Inventors: Mihai Christodorescu, San Jose, CA (US); Alexey Aliev, Santa Clara, CA (US); Dinakar Dhurjati, Santa Clara, CA (US); Hilmi Gunes Kayacik, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 19 days.

(21) Appl. No.: 15/385,489

(22) Filed: Dec. 20, 2016

(65) Prior Publication Data
US 2018/0173685 A1 Jun. 21, 2018

(51) Int. Cl.
G06F 17/27 (2006.01)
G06F 17/22 (2006.01)
G06F 17/30 (2006.01)
H04L 29/06 (2006.01)

(52) U.S. Cl.
CPC .... G06F 17/2247 (2013.01); G06F 17/30864 (2013.01); H04L 63/1425 (2013.01); H04L 63/1433 (2013.01)

(58) Field of Classification Search
CPC .......... G06F 17/2247; G06F 17/30864; G06F 17/3089; H04L 63/1425; H04L 63/1433
USPC ...................................................... 715/234
See application file for complete search history.

(56) References Cited

U.S. PATENT DOCUMENTS

| | | | |
|---|---|---|---|
| 9,124,624 B2 | 9/2015 | Amit et al. | |
| 9,208,235 B1 | 12/2015 | Liu | |
| 9,280,268 B2 | 3/2016 | Von Bochmann et al. | |
| 9,298,850 B2* | 3/2016 | Benjamin | G06F 17/2247 |
| 9,405,833 B2 | 8/2016 | Tuttle et al. | |
| 9,411,958 B2* | 8/2016 | Wang | G06F 21/556 |
| 9,680,856 B2* | 6/2017 | Borohovski | H04L 63/1433 |
| 9,699,142 B1* | 7/2017 | Allen | H04L 63/1433 |
| 2007/0061877 A1* | 3/2007 | Sima | H04L 63/12 726/12 |
| 2007/0234409 A1* | 10/2007 | Eisen | H04L 63/0876 726/6 |

(Continued)

OTHER PUBLICATIONS

Eloone, "How Does a Web Session Work?", published Oct. 29, 2013, located at https://machinesaredigging.com/2013/10/29/how-does-a-web-session-work/, pp. 1-21.*

*Primary Examiner* — Wilson W Tsui
(74) *Attorney, Agent, or Firm* — Jae-Hee Choi; The Marbury Law Group (57) ABSTRACT

Various embodiment methods for performing security-focused web crawling by a server may include identifying sensitive data on a first web page, and generating a first document object model (DOM) for the first web page in which the first DOM represents the sensitive data on the first web page. Various embodiments may further include comparing one or more attributes of the sensitive data in the first DOM with the one or more attributes of the sensitive data in a second DOM for a second web page, and determining whether the first web page is different from the second web page based on the comparison of the one or more attributes of the sensitive data in the first DOM and the second DOM.

26 Claims, 7 Drawing Sheets

(56) References Cited

U.S. PATENT DOCUMENTS

2012/0131428 A1  5/2012 Tsai et al.
2015/0193549 A1* 7/2015 Frye ............... G06F 17/30876
                                                715/739

* cited by examiner

SECURITY-FOCUSED WEB APPLICATION CRAWLING

BACKGROUND

Web applications are enabled by a web server in communication with a client device executing a web client, such as a web browser environment, Hypertext Markup Language (HTML) pages, and JavaScript code. Web crawling is the act of exploring various pages in a web application from the point of view of the web client. As web technology becomes more complex (e.g., implementing Asynchronous JavaScript and XML (AJAX), WebSockets, web workers, etc.), web crawling has to adapt to handle more complex behaviors and interactions with web applications.

Web crawling may be useful for security purposes. For example, web application vulnerability scanners traverse web applications via web crawling to identify vulnerable portions of web applications. Similarly, web application firewalls traverse web applications and construct a baseline of normal interactions between the web server and the web client, which may be useful for anomaly detection. To be effective, web crawling for security purposes should be complete. In other words, all pages should be visited under all relevant input conditions. For example, a common heuristic may be to follow all links and trigger all actions on each page until no new pages are reached.

SUMMARY

Various embodiments include methods for performing security-focused web crawling by a server. Various embodiments may include identifying sensitive data on a first web page, and generating a first document object model (DOM) for the first web page that represents the sensitive data on the first web page. Various embodiments may further include comparing one or more attributes of the sensitive data in the first DOM with the one or more attributes of the sensitive data in a second DOM for a second web page. Various embodiments may further include determining whether the first web page is different from the second web page based on the comparison of the one or more attributes of the sensitive data in the first DOM and the second DOM.

In some embodiments, identifying sensitive data on the first web page may include selecting a first data item from one or more data items in the first web page, and extracting a location of the first data item in the first web page, comparing the first data item across a plurality of web browsing sessions in which each of the plurality of web browsing sessions is associated with a different user. Such embodiments may further include determining whether the first data item changes across the plurality of web browsing sessions. Such embodiments may further include determining whether the first data item correlates with a session identifier or a user input of each of the plurality of web browsing sessions in response to determining that the first data item changes across the plurality of web browsing sessions. Such embodiments may further include identifying the first data item as sensitive data having a dynamic pattern in response to determining the first data item correlates with a session identifier or a user input of each of the plurality of web browsing sessions.

Some embodiments may further include determining whether the first data item changes across a plurality of web pages, including the first web page, in a first web browsing session of the plurality of web browsing sessions, and identifying the first data item as a unique identifier of the first web browsing session in response to determining that the first data item does not change across the plurality of web pages. In some embodiments, the unique identifier may include a session identifier, a user identifier, or a role identifier. Some embodiments may further include determining whether the first data item matches a predetermined data pattern, and identifying the first data item as sensitive data having a static pattern in response to determining the first data item matches a predetermined data pattern.

In some embodiments, the one or more attributes may include at least one of a location of sensitive data, a type of sensitive data, an adjacency between sensitive data, a distance between sensitive data, and a location of JavaScript acting on the sensitive data. In some embodiments, generating the first DOM for the first web page may include generating the first DOM that represents the sensitive data and excludes some or all of the non-sensitive data on the first web page. In such embodiments, the second DOM may represent the sensitive data and exclude non-sensitive data on the second web page. Some embodiments may further include generating a graph of a plurality of web pages including the first web page and the second web page, in which each node in the graph represents a web page in the plurality of web pages and each edge in the graph represents navigation links between the plurality of web pages, and providing the graph to a system for analysis.

Further embodiments include a server having a network interface and a processor configured to perform operations of the methods summarized above. Further examples include a non-transitory processor-readable storage medium having stored thereon processor-executable software instructions configured to cause a processor of a server to perform operations of the methods summarized above. Further examples include a server that includes means for performing functions of the operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of the claims.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

Some web servers host web applications, which may include various web pages and applications that execute within the web pages, such as Java applets and other dynamic objects. Web crawlers hosted on servers and other computing systems may crawl through a web application to scan for security vulnerabilities. To complete a security scan, the web crawler usually follows all links in the web page and triggers all actions on each web page until no new pages are reached. This is a common web crawling heuristic called completeness. However, it may be difficult to determine how to compare a new page against an existing page. Existing solutions may remove all text and compare the document object model (DOM) for both pages, or take into account the amount of information visible to the user. However, these known solutions may not be effective for identifying security vulnerabilities, particularly those hidden in text removed by existing solutions.

In overview, various embodiments provide methods for performing security-focused web crawling by a server. The server may host a cloud-based security-focused web crawling application. The server may identify sensitive data on a first web page. The sensitive data may have a static pattern (e.g., follow a predictable data pattern), such as credit card numbers and phone numbers, or may have a dynamic pattern (e.g., follow an unpredictable data pattern). The server may identify sensitive data having a static pattern by determining whether data items in the first web page match a predetermined data pattern. The server may identify sensitive data having a dynamic pattern by extracting the locations of data items in the first web page and comparing the data items across a plurality of web browsing sessions, each session associated with a different user. Data items that change across the plurality of web browsing sessions and are correlated with session identifiers and user inputs across the web browsing sessions may be identified as sensitive data having a dynamic pattern.

After the sensitive data is identified, the server may generate a first DOM for the first web page that represents the sensitive data on the first web page. The server may generate the first DOM so that at least some of the non-sensitive data on the first web page is excluded. In some embodiments, the server may generate the first DOM that represents the sensitive data and excludes non-sensitive data on the first web page. The server may compare one or more attributes of the sensitive data in the first DOM with the one or more attributes of the sensitive data in a second DOM for a second web page, which also represents sensitive data on the second web page. The second DOM may also exclude some or all of the non-sensitive data on the second web page. The attributes may include at least one of a location of sensitive data, a type of sensitive data, an adjacency between sensitive data, a distance between sensitive data, and a location of JavaScript acting on the sensitive data. The server may determine whether the first web page differs from the second web page with respect to sensitive data based on the comparison of the one or more attributes of the sensitive data in the first DOM and the second DOM.

Figure 1:
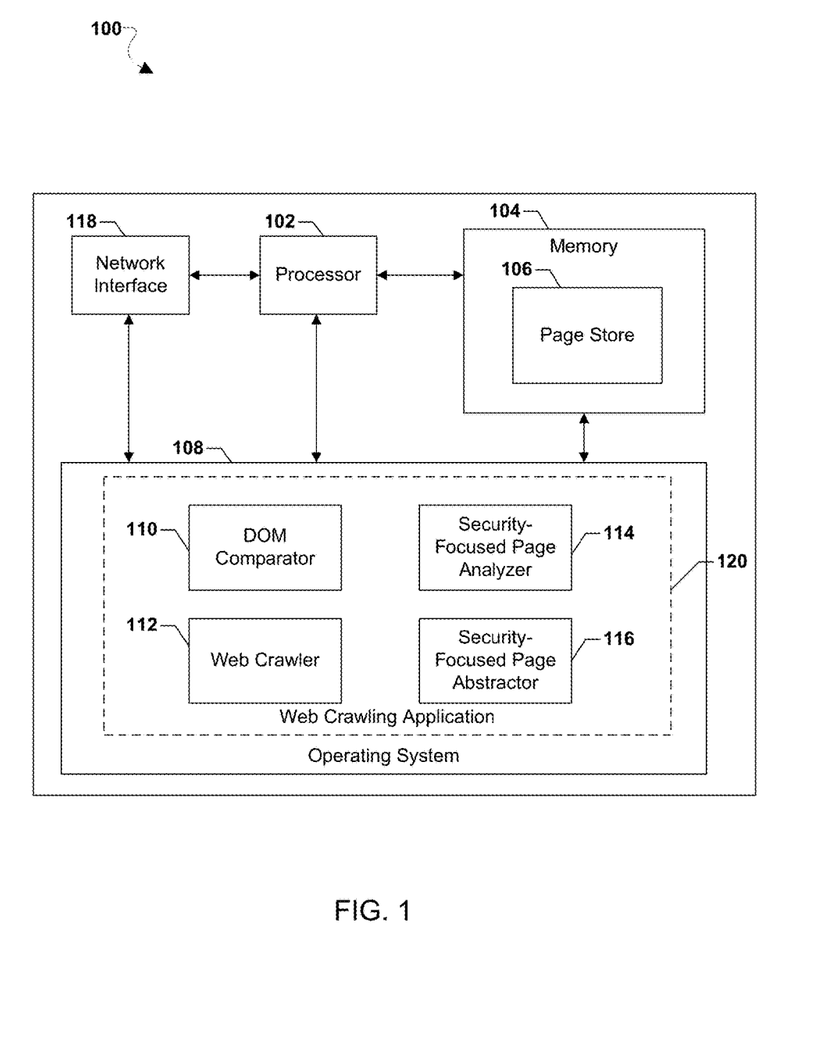
FIG. 1 is a block diagram of a server suitable for use with various embodiments.

FIG. 1 is a functional block diagram of a server 100 suitable for implementing various embodiments. The server 100 includes a processor 102 for executing software instructions. The server 100 may include a memory 104 for storing code and data. The memory 104 may include a page store 106 that stores information about previously visited web pages from a number of web browsing sessions. The server 100 may utilize information about previously visited web pages and web browsing sessions to identify sensitive data on the web pages, particularly sensitive data with dynamic patterns. The memory 104 may include one or more of disk drives, random access memory (RAM), dynamic RAM (DRAM), static RAM (SRAM), read only memory (ROM), electrically erasable programmable ROM (EEPROM), or other types of non-transitory computer-readable storage media.

The server 100 may include an operating system 108 for supporting various applications executing on the server 100. The server 100 may host a cloud-based web crawling application 120 that may be utilized by various computing devices connected to the server 100 over a network. The web crawling application 120 may be used to detect security vulnerabilities in various web pages through web crawling and page analysis. The web crawling application 120 may include a web crawler 112. The web crawler 112 may be configured to explore and log web pages in their totality. For example, the web crawler 112 may start at a homepage for a website and follow all links and trigger all actions on each web page on the website until no new pages are reached. The web crawler 112 may log each visited web page in a web browsing session in the page store 106.

The web crawling application 120 may also include a security-focused page analyzer 114. The security-focused page analyzer 114 may identify sensitive data on web pages, including sensitive data having a static pattern (e.g., a predictable data pattern) such as credit card numbers and phone numbers, and sensitive data having a dynamic pattern (e.g., a non-predictable data pattern). Sensitive data are data that are not part of the web page structure or aesthetics. Sensitive data may include, but are not limited to, financial data, biographical data, health and medical data, data that may personally identify a user, location and address data, account data for various websites (e.g., usernames and passwords), and other types of data that a user may consider private or confidential.

The web crawling application 120 may also include a security-focused page abstractor 116. The security-focused page abstractor 116 may generate a DOM of a web page that was logged by the web crawler 112. The security-focused page abstractor 116 may receive input from the security-focused page analyzer 114 about sensitive data on the web page. In some embodiments, the security-focused page abstractor 116 may generate the DOM so that it represents sensitive data on the web page. In some embodiments, the security-focused page abstractor 116 may generate the DOM so that it represents sensitive data and excludes at least some of the non-sensitive data on the web page. In some embodiments, the security-focused page abstractor 116 may generate the DOM by excluding non-sensitive data when generating the DOM so that the DOM represents sensitive data on the web page and excludes non-sensitive data.

The web crawling application 120 may also include a DOM comparator 110. The DOM comparator 110 may compare the DOM of web pages generated by the security-focused page abstractor 116 to determine whether they are different web pages with respect to sensitive data. This may aid the web crawling application 120 when scanning for security vulnerabilities on the web page by excluding non-sensitive data (i.e., ignore content that does not represent a security threat).

The server 100 may include a network interface 118. The network interface 118 may be configured to communicate with various networks such as mobile wireless network operators, WWANs (e.g., mobile telephony networks, the Internet) and local area networks (LANs). The server 100 may use the network interface 118 to connect with various web pages to conduct web crawling and connect to various computing devices that may utilize the web crawling application 120 hosted on the server 100.

Figure 2:
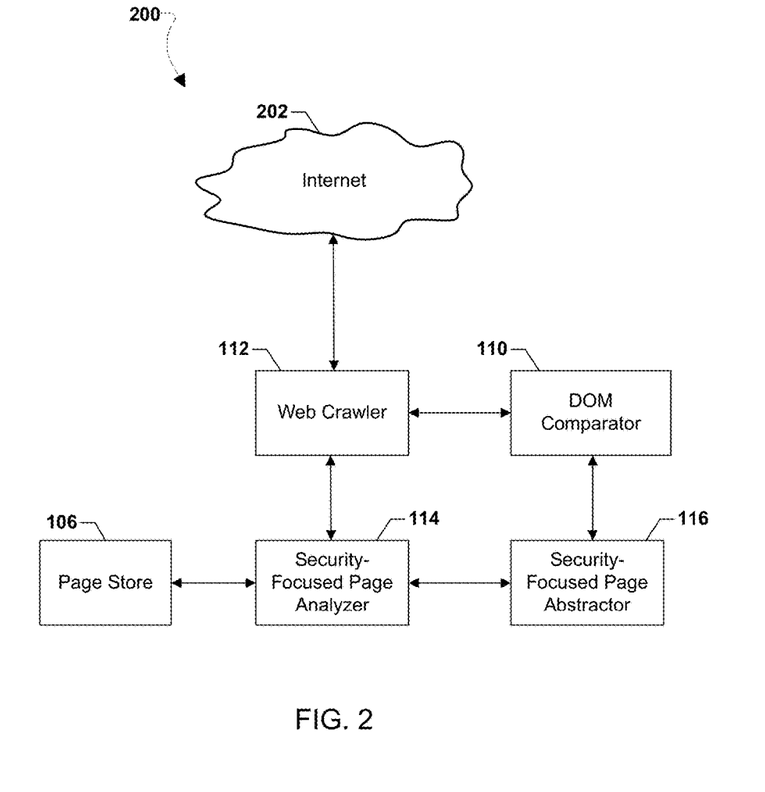
FIG. 2 is a system block diagram illustrating a network system suitable for implementing security-focused web crawling according to various embodiments.

FIG. 2 includes a block diagram 200 illustrating the operation of the web crawling application 120 on the server 100 according to various embodiments. The web crawler 112 may visit a web page hosted by a web server through a network, such as the Internet 202. The web crawler 112 may store a copy of the web page on the server, such as in the page store 106. The web page may include a number of data items or objects. Data items may include text, images, links, embedded videos, tables, lists, forms and form fields, buttons, and any other form of data that may appear on the web page. The web crawler 112 may notify the security-focused page analyzer 114 that a new web page is available for analysis.

The security-focused page analyzer 114 may identify sensitive data on the web page. Some forms of sensitive data may have a static data pattern, such as credit card numbers (e.g., 16 digits, divided into four groups of four), phone numbers (e.g., a 10-digit number for phone numbers in the United States, divided into two groups of three numbers and a group of four numbers), and social security numbers (e.g., a 10-digit number divided into a group of three numbers, a group of two numbers, and a group of four numbers). The security-focused page analyzer 114 may utilize pattern matching to determine whether data items on the web page match any predetermined data patterns corresponding to particular types of sensitive data. Data items that match a predetermined data pattern may be identified as sensitive data having a static pattern.

Some forms of sensitive data may have a dynamic data pattern such that they cannot be identified through pattern matching. For example, usernames, passwords, addresses, and medical information are of variable length and do not follow a predictable data pattern. In various embodiments, the security-focused page analyzer 114 may identify sensitive data having a dynamic pattern by comparing data items on a web page across different web browsing sessions. For example, the security-focused page analyzer 114 may track data items across web pages in the same web browsing session. The web pages and data items of the web browsing session may be stored in the page store 106. Data items that do not change across web pages in the same web browsing sessions are likely to be session identifiers (ID), user ID, role ID, or other identifiers unique to the web browsing session. The security-focused page analyzer 114 may extract the location of each data item on the web page(s) and associate each data item with the session or user ID.

The security-focused page analyzer 114 may then analyze the data items on the same web page across different web browsing sessions. Each web browsing session may be associated with a different user. Previous web browsing sessions by various users and the web pages visited in each session may be stored in the page store 106. Data items that change from session to session are likely to be specific to each user and thus may be sensitive data. The security-focused page analyzer 114 may determine whether changing data items are correlated with session IDs or user inputs in each session. Data items that change between sessions and are correlated with session IDs or user inputs (e.g., data times that appear as a result of user-supplied input) indicate user-specific sensitive data. Thus, the security-focused page analyzer 114 may identify such data items as sensitive data having a dynamic pattern.

Once the sensitive data in the web page is identified by the security-focused page analyzer 114, the security-focused page abstractor 116 may generate a DOM of the web page. A DOM is an abstract tree structure representation of a web page in which each object or data item in the web page is represented as a node. For example, each node in the DOM may represent HTML elements (e.g., tables, lists, images, forms, buttons, DIV sections), text, JavaScript, and other embedded objects (e.g., video player). In some embodiments, the security-focused page abstractor 116 may generate the DOM so that it represents the sensitive data in the web page. In some embodiments, the security-focused page abstractor 116 may exclude some or all non-sensitive data in the web page when generating the DOM for the web page so that the resulting DOM represents the sensitive data in the web page and excludes non-sensitive data.

The DOM comparator 110 may compare the DOMs of two web pages to determine whether they are different with respect to sensitive data. For example, the DOM comparator 110 may compare one or more attributes of the sensitive data in each DOM. The one or more attributes may include, but are not limited to, a location of sensitive data, a type of sensitive data, an adjacency between sensitive data, a distance between sensitive data, and a location of JavaScript acting on the sensitive data. If the attributes of the sensitive data are different between the two DOMs, then the DOMs are different with respect to sensitive data. Further analysis may then be performed on the web pages to determine if there are any security vulnerabilities.

Figure 3:
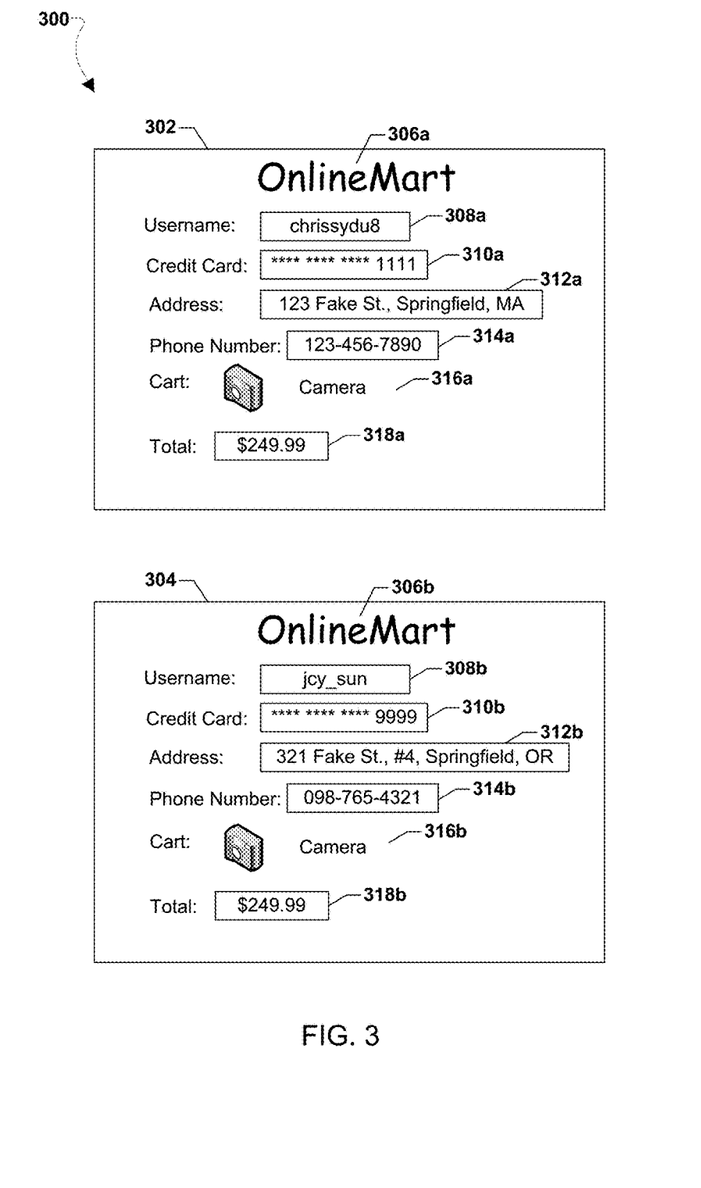
FIG. 3 is a block diagram illustrating examples of web pages for web crawling according to various embodiments.

FIG. 3 is a block diagram 300 illustrating examples of web pages for web crawling according to various embodiments. The block diagram 300 includes a first web page 302 and a second web page 304. The first web page 302 and the second web page 304 are the same web page but in different web browsing sessions with different users. The first web page 302 may include data items 306*a*, 308*a*, 310*a*, 312*a*, 314*a*, 316*a*, and 318*a*. The second web page 304 may include data items 306*b*, 308*b*, 310*b*, 312*b*, 314*b*, 316*b*, and 318*b*.

A web crawling application may identify the sensitive data in the first web page 302 and the second web page 304. A component in the web crawling application, such as a security-focused page analyzer, may scan the web pages for data items that contain sensitive data. The sensitive data may have a static or a dynamic data pattern. To identify sensitive data having a static pattern, the web crawling application may determine whether any data items match a predetermined data pattern. For example, the web crawling application may determine that the data items 310*a* and 310*b* match a predetermined data pattern for a credit card number, and that the data items 314*a* and 314*b* match a predetermined data pattern for a phone number. The web crawling application may identify the data items 310*a*, 310*b*, 314*a*, and 314*b* as sensitive data having a static pattern.

To identify sensitive data having a dynamic pattern, the web crawling application may compare the same data items on the same web page across different web browsing sessions. The web crawling application may first extract the location of each data item on the web page so that the same data items are compared across sessions. The web crawling application may compare the data items 306*a*, 308*a*, 310*a*, 312*a*, 314*a*, 316*a*, and 318*a* with the data items 306*b*, 308*b*, 310*b*, 312*b*, 314*b*, 316*b*, and 318*b* respectively.

Data items that do not change across sessions are likely non-sensitive data. For example, data items 306a and 306b, 316a and 316b, and 318a and 318b do not change between web browsing sessions and so the web crawling application may identify the data items 306a, 306b, 316a, 316b, 318a, and 318b as non-sensitive data. Data items that change across web browsing sessions and correlate with session ID or user input may be indicative of sensitive data. For example, the data items 308a and 308b, and 312a and 312b change across sessions and correlate with session ID and user input. The web crawling application may identify the data items 308a, 308b, 312a, and 312b as sensitive data having a dynamic pattern.

Figure 4:
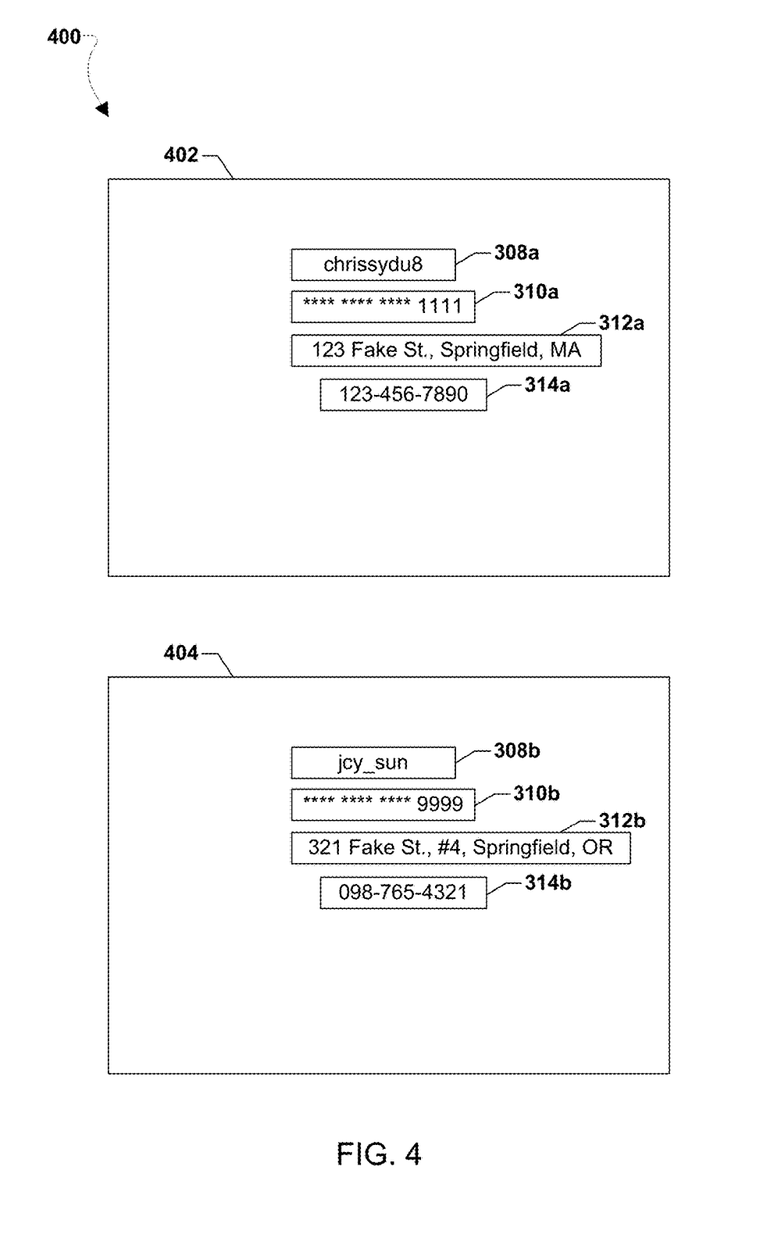
FIG. 4 is a block diagram illustrating examples of web pages in which non-sensitive data is excluded according to various embodiments.

The web crawling application may generate DOMs for the first web page 302 and the second web page 304 that represent sensitive data as illustrated in FIG. 4. FIG. 4 includes a block diagram 400 illustrating examples of web pages in which non-sensitive data is excluded according to various embodiments. For example, non-sensitive data may be excluded from the first web page 302, resulting in the first web page 402. The first web page 402 contains the data items identified as sensitive data, including the data items 308a, 310a, 312a, and 314a. The data items 306a, 316a, and 318a determined to be non-sensitive data are not present in the first web page 402. Likewise, non-sensitive data may be excluded from the second web page 304, resulting in second web page 404. The second web page 404 contains the data items identified as sensitive data, including the data items 308b, 310b, 312b, and 314b. The data items 306b, 316b, and 318b determined to be non-sensitive data are not present in the second web page 404. The web crawling application may generate DOMs from the first web page 402 and the second web page 404. While FIG. 4 illustrates an example in which all non-sensitive data is excluded before generating DOMs, in some embodiments some non-sensitive data may remain when generating DOMs.

Figure 5:
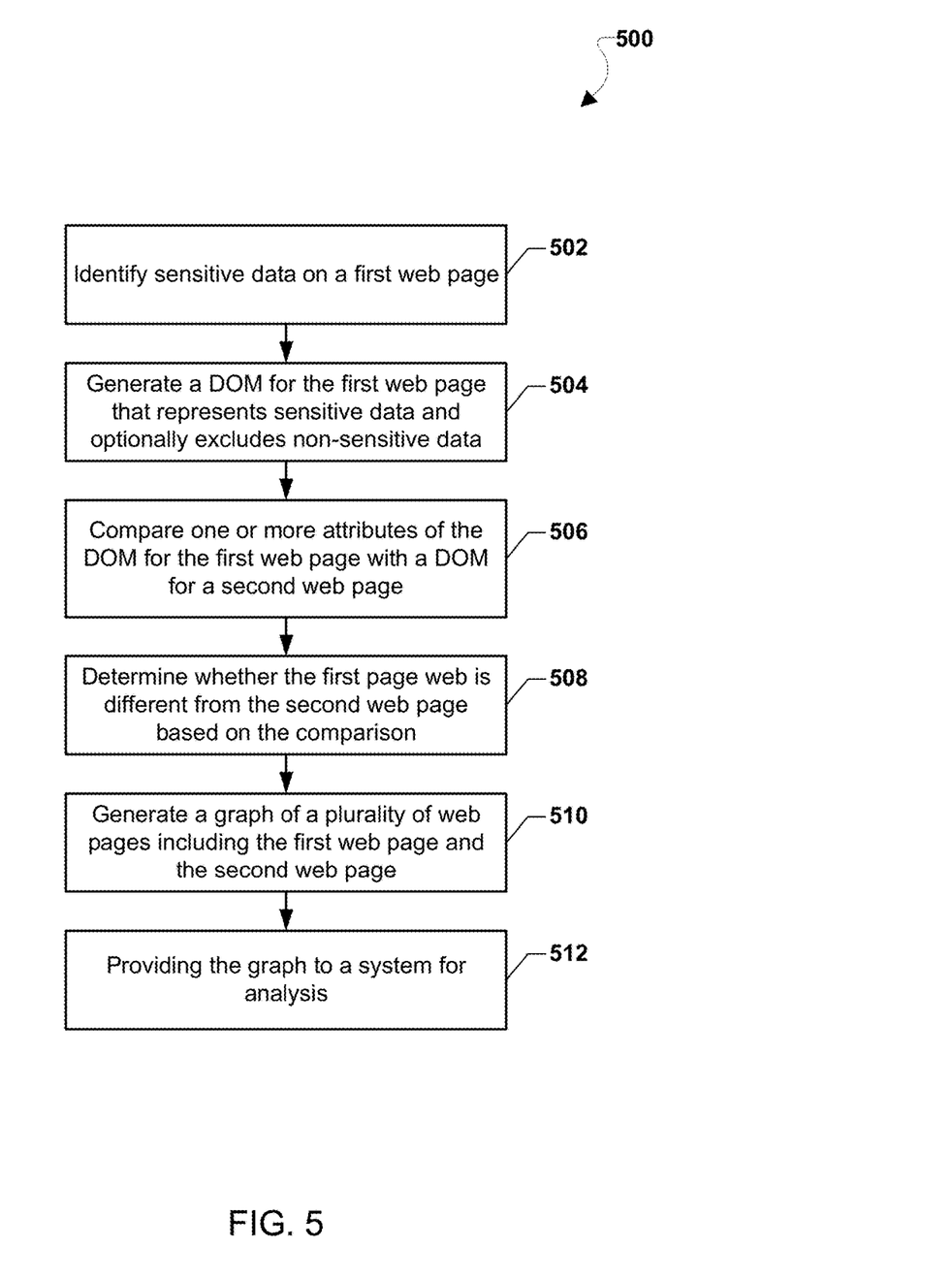
FIG. 5 is a process flow diagram illustrating a method for performing security-focused web crawling according to various embodiments.

FIG. 5 illustrates a method 500 for performing security-focused web crawling according to various embodiments. The method 500 may be implemented with a processor (e.g., the processor 102 or the like) of a server (e.g., the server 100) that executes a web crawling application (e.g., the web crawling application 120). The web crawling application may perform web crawling on web applications to scan for security vulnerabilities.

In block 502, the server processor may identify sensitive data on a first web page. The web crawling application may log a visited web page, which may include storing the web page and all data items on the web page in a page store on the server. Some of the data items may include sensitive data, such as financial information, biographical information, medical information, or other information that is private or confidential to a user. As described, some types of sensitive data may have a static or predictable data pattern, such as credit card numbers and phone numbers, while other types of sensitive data may have a dynamic or non-predictable data pattern, such as passwords, addresses, and medical information. The web crawling application may use pattern matching to identify sensitive data having a static pattern, and may compare data items across different web browsing sessions to identify sensitive data having a dynamic pattern. Methods for identifying sensitive data on a web page in block 502 are described further with reference to FIG. 6.

In block 504, the processor may generate a DOM for the first web page that represents sensitive data on the first web page. In an embodiment, the web crawling application may generate the DOM focusing on the sensitive data on the first web page. In another embodiment, the web crawling application may exclude some of the non-sensitive data on the web page when generating the DOM such that sensitive data is represented by the DOM and some of the non-sensitive data is excluded. In a further embodiment, the web crawling application may exclude all of the non-sensitive data on the web page when generating the DOM such that sensitive data is represented by the DOM and all of the non-sensitive data is excluded.

In block 506, the processor may compare one or more attributes of the DOM for the first web page to a similarly generated DOM for a second web page. The web crawling application may have previously logged the second web page, identified the sensitive data on the second web page, and generated the DOM for the second web page that represents the sensitive data. In some embodiments, the second web page may exclude some of the non-sensitive data on the second web page. In some embodiments, the second web page may exclude all of the non-sensitive data on the second web page. The one or more attributes may include at least one of a location of sensitive data, a type of sensitive data, an adjacency between sensitive data, a distance between sensitive data, and a location of JavaScript acting on the sensitive data. The attributes may be obtained or determined from the DOM of each web page.

In block 508, the processor may determine whether the first web page is different from the second web page with respect to sensitive data based on the comparison of the DOM of each web page. The first web page and the second web page are different if at least one attribute is different for at least one data item. For example, if the location of a data item containing sensitive data is different between the two web pages, then the two web pages are considered different. This determination may be useful in web crawling for security vulnerabilities by focusing on the relevant data items on the web pages (i.e., data items containing sensitive data that may pose a security threat) rather than comparing all data items.

In block 510, the processor may generate a graph of a plurality of web pages, including the first web page and the second web page. For example, each node in the graph may correspond to a unique web page with respect to sensitive data, and each edge in the graph may correspond to navigation links between the web pages.

In block 512, the processor may provide the graph to a system for analysis. For example, the graph may be provided to third party systems, software, and/or human analysts in order to conduct functional testing, security review, privacy review, or another type of analysis of the plurality of web pages using the graph. In this manner, the method 500 provides a way to perform security-focused web crawling.

Figure 6:
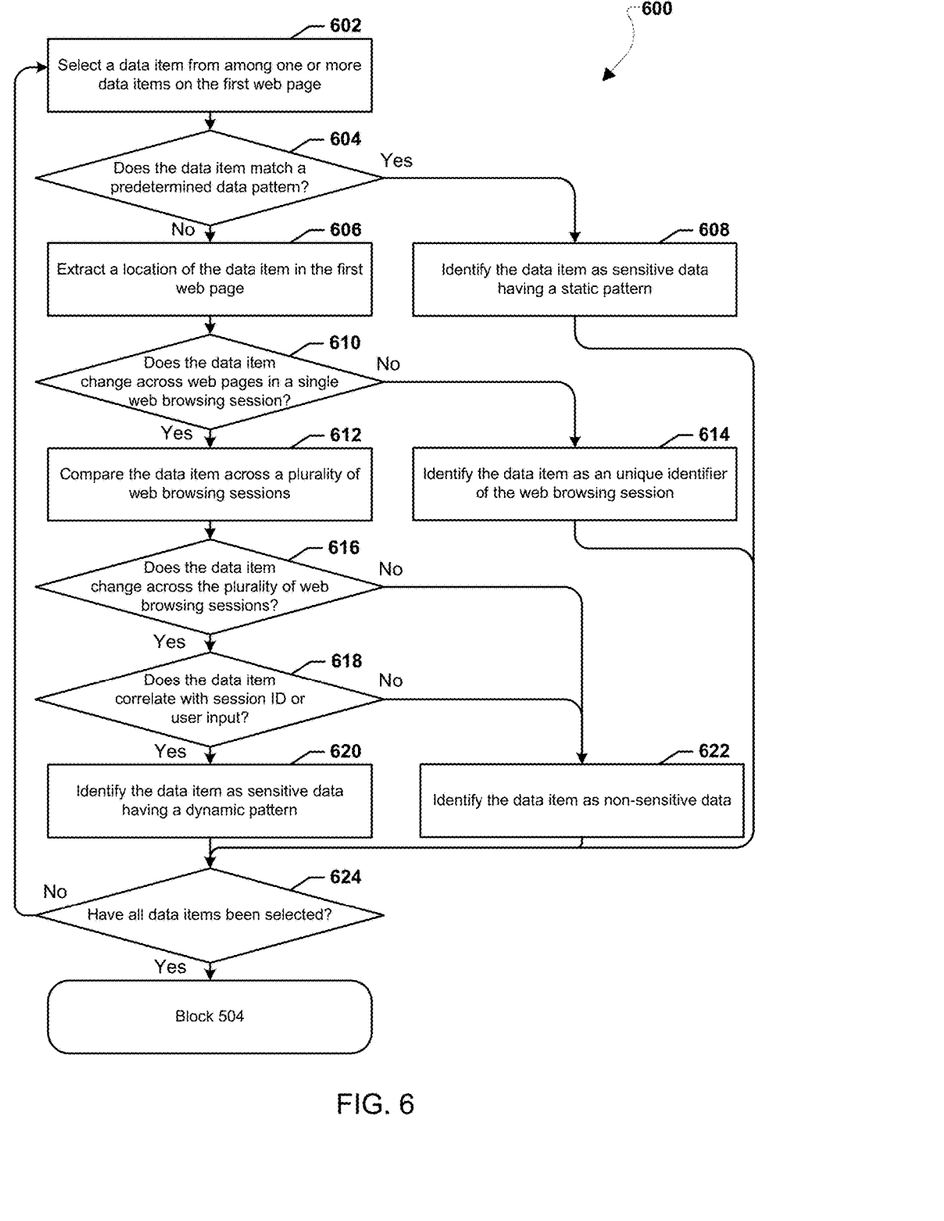
FIG. 6 is a process flow diagram illustrating a method for identifying sensitive data on a web page according to various embodiments.

FIG. 6 illustrates a method 600 for identifying sensitive data on a web page according to various embodiments. The method 600 includes operations that may be performed in block 502 of the method 500 and may be implemented with a processor (e.g., the processor 102 or the like) of a server (e.g., the server 100) that executes a web crawling application (e.g., the web crawling application 120). The web crawling application may perform web crawling on web applications to scan for security vulnerabilities.

In block 602, the server processor may select a data item from among one or more data items on the first web page. The first web page may have been scanned and logged by the web crawling application. The first web page may contain one or more data items, such as text, images, videos, tables, lists, forms and form fields, JavaScript, and other embedded objects. The processor may sequentially select data items from the first web page for analysis. The processor may order the selection in a variety of ways, for example from the top of the web page to the bottom.

In determination block 604, the processor may determine whether the selected data item matches a predetermined data pattern. The web crawling application may store a number of predetermined data patterns representing sensitive data having a static or predictable data pattern. For example, credit card numbers, phone numbers, and social security numbers have predictable data patterns. The web crawling application may determine whether the data item has the same data pattern as a predetermined data pattern (i.e., matches the pattern of sensitive data having a static pattern).

In response to determining that the data item matches a predetermined data pattern (i.e., determination block 604="Yes"), the processor may identify the data item as sensitive data having a static pattern in block 608.

In response to determining that the data item does not match a predetermined data pattern (i.e., determination block 604="No"), the processor may extract a location of the data item in the first web page in block 606. The processor may also associate the data item with the web browsing session that includes the first web page.

In determination block 610, the processor may determine whether the data item changes across a plurality of web pages (including the first web page) in a single web browsing session. The server may store all web pages visited by a user during a single web browsing session. The web crawling application may search through the web pages of the web browsing session for instances of the same data item across the web pages.

In response to determining that the data item does not change across a plurality of web pages in a single web browsing session (i.e., determination block 610="No"), the processor may identify the data item as a unique identifier of the web browsing session in block 614. For example, the data item may be a session ID, user ID, or role ID, which stays constant through the web browsing session.

In response to determining that the data item changes across a plurality of web pages in a single web browsing session (i.e., determination block 610="Yes"), the processor may compare the data item across a plurality of web browsing sessions in block 612. The server may store a plurality of web browsing sessions for a plurality of different users. The processor may search for the first web page among the different web browsing sessions and compare the value of the same data item (using the extracted location) across the different sessions.

In determination block 616, the processor may determine whether the data item changes across the plurality of web browsing sessions. Changes in a data item across sessions may be an indication that the data item is user-specific sensitive data.

In response to determining that the data item does not change across the plurality of web browsing sessions (i.e., determination block 616="No"), the processor may identify the data item as non-sensitive data in block 622. In other words, data items that do not change across different sessions and users are likely not sensitive data.

In response to determining that the data item changes across the plurality of web browsing sessions (i.e., determination block 616="Yes"), the processor may determine whether the data item correlates with a session ID or a user input of each of the web browsing sessions in determination block 618. The server may store the session ID associated with each web browsing session and also store user inputs in each web browsing session. A high correlation between the data item and the session ID (e.g., changes with session ID) or a user input (e.g., the data item matches a user input or changes or appears with user input) may indicate that the data item contains user-specific sensitive data.

In response to determining that the data item does not correlate with a session ID or a user input of each of the web browsing sessions (i.e., determination block 618="No"), the processor may identify the data item as non-sensitive data in block 622. In other words, data items that do not vary with session ID or user input are likely not sensitive data.

In response to determining that the data item correlates with a session ID or a user input of each of the web browsing sessions (i.e., determination block 618="Yes"), the processor may identify the data item as sensitive data having a dynamic pattern in block 620.

Following the operations any of blocks 608, 614, 620 and 622, the processor may determine whether all data items on the first web page have been selected in determination block 624. In response to determining that not all data items on the first web page have been selected (i.e., determination block 624="No"), the processor may select another data item from among one or more data items on the first web page in block 602 the operations of the method 600 may be repeated.

In response to determining that all data items on the first web page have been selected (i.e., determination block 624="Yes"), the processor may generate a DOM for the first web page that represents the sensitive data on the first web page in block 504 of the method 500 as described. In this manner, the method 600 provides a way for a web crawling application to identify sensitive data on a web page, regardless of whether the data fits a predictable pattern or not.

Figure 7:
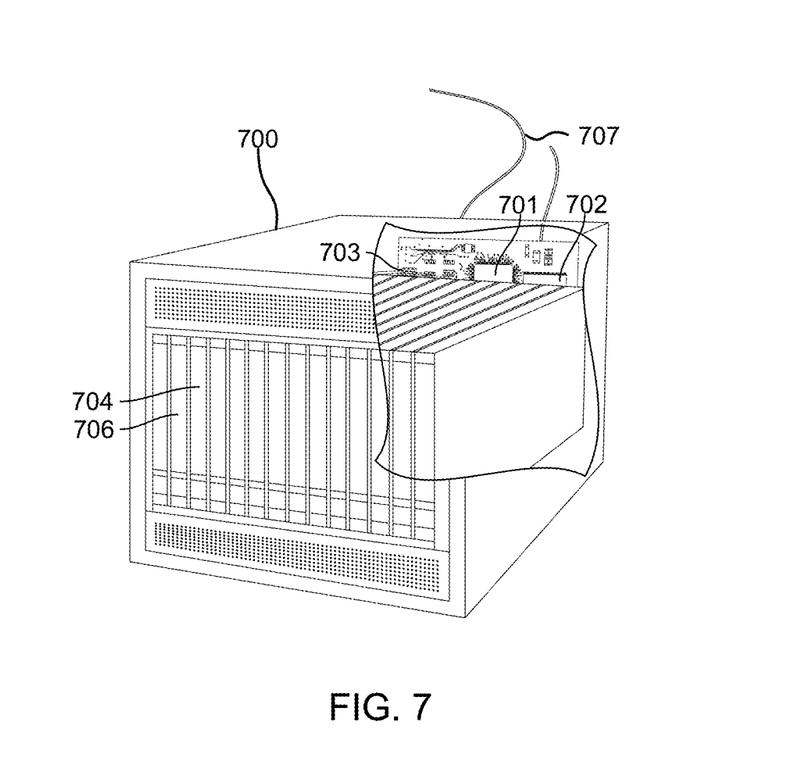
FIG. 7 is a component block diagram of a server suitable for implementing some embodiment methods.

The various embodiments may also be implemented on any of a variety of commercially available server devices, such as the server 700 illustrated in FIG. 7. The server 700 typically includes a processor 701 coupled to volatile memory 702 and a large capacity nonvolatile memory, such as a disk drive 704. The server 700 may also include a floppy disc drive, compact disc (CD) or digital versatile disc (DVD) disc drive 706 coupled to the processor 701. The server 700 may also include network access ports 703 coupled to the processor 701 for establishing network interface connections with a network 707, such as a local area network coupled to other broadcast system computers and servers, the Internet, the public switched telephone network, and/or a cellular data network. Examples of mobile telephony networks include Third Generation (3G), Fourth Generation (4G), Long Term Evolution (LTE), Time Division Multiple Access (TDMA), Code Division Multiple Access (CDMA), CDMA 2000, Wideband CDMA (WCDMA), Global System for Mobile Communications (GSM), Single-Carrier Radio Transmission Technology (1×RTT), and Universal Mobile Telecommunications Systems (UNITS).

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, units, circuits, and algorithm operations described in connection with the embodiments disclosed herein may be implemented as electronic hardware, computer software, or combinations of both. To clearly illustrate this interchangeability of hardware and software, various illustrative components, blocks, units, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, units, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software unit that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, compact disc read only memory (CD-ROM) or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of various embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for performing security-focused web crawling by a server, comprising:
   identifying sensitive data on a first web page of a first user web browsing session, wherein identifying sensitive data comprises:
      selecting a first data item from one or more data items in the first web page;
      extracting a location of the first data item in the first web page;
      comparing the first data item with same data items on different webpage instances of the same web page browsed during a plurality of web browsing sessions, wherein each of the plurality of web browsing sessions is associated with a different user;
      determining whether the first data item changes across the plurality of different user web browsing sessions;
      identifying the first data item as non-sensitive data in response to determining that the first data item does not change across the plurality of web browsing sessions;
      determining whether the first data item correlates with a session identifier or a user input of each of the plurality of web browsing sessions in response to determining that the first data item changes across the plurality of web browsing sessions; and
      identifying the first data item as sensitive data having a dynamic pattern in response to determining the first data item correlates with a session identifier or a user input of each of the plurality of web browsing sessions;
   generating a first document object model (DOM) for the first web page that includes the sensitive data on the first web page and excludes at least some data items that are identified as non-sensitive;
   comparing one or more attributes of the sensitive data in the first DOM with the one or more attributes of sensitive data in a second DOM for a second web page instance of the same web page from a second user web browsing session of the different web browsing sessions; and
   determining whether the first web page is different from the second web page based on the comparison of the one or more attributes of the sensitive data in the first DOM and the second DOM being determined from the comparison as different.

2. The method of claim 1, the method further comprising:
   determining whether the first data item changes across a plurality of web pages, including the first web page, in a first web browsing session of the plurality of web browsing sessions; and
   identifying the first data item as a unique identifier of the first web browsing session in response to determining that the first data item does not change across the plurality of web pages.

3. The method of claim 2, wherein the unique identifier comprises a session identifier, a user identifier, or a role identifier.

4. The method of claim 1, further comprising:
   determining whether the first data item matches a predetermined data pattern; and
   identifying the first data item as sensitive data having a static pattern in response to determining the first data item matches a predetermined data pattern.

5. The method of claim 1, wherein the one or more attributes comprise at least one of a location of sensitive data, a type of sensitive data, an adjacency between sensitive data, a distance between sensitive data, and a location of JavaScript acting on the sensitive data.

6. The method of claim 1, wherein generating the first DOM for the first web page that represents the sensitive data on the first page comprises generating the first DOM for the first web page that represents the sensitive data and excludes non-sensitive data on the first web page, and
   wherein the second DOM represents sensitive data and excludes non-sensitive data on the second web page.

7. The method of claim 1, further comprising:
   generating a graph of a plurality of web pages including the first web page and the second web page, wherein each node in the graph represents a web page in the plurality of web pages and each edge in the graph represents navigation links between the plurality of web pages; and
   providing the graph to a system for analysis.

8. A server, comprising:
   a network interface; and
   a processor coupled to the network interface and configured with processor-executable instructions to:
     identify sensitive data on a first web page of a first user browsing session by:
       selecting a first data item from one or more data items in the first web page;
       extracting a location of the first data item in the first web page;
       comparing the first data item with same data items on different webpage instances of the same web page browsed during a plurality of web browsing sessions, wherein each of the plurality of web browsing sessions is associated with a different user;
       determining whether the first data item changes across the plurality of different user web browsing sessions;
       identifying the first data item as non-sensitive data in response to determining that the first data item does not change across the plurality of web browsing sessions;
       determining whether the first data item correlates with a session identifier or a user input of each of the plurality of web browsing sessions in response to determining that the first data item changes across the plurality of web browsing sessions; and
       identifying the first data item as sensitive data having a dynamic pattern in response to determining the first data item correlates with a session identifier or a user input of each of the plurality of web browsing sessions;
     generate a first document object model (DOM) for the first web page that includes the sensitive data on the first web page and excludes at least some data items that are identified as non-sensitive;
     compare one or more attributes of the sensitive data in the first DOM with the one or more attributes of sensitive data in a second DOM for a second web page instance of the same web page from a second user web browsing session of the different web browsing sessions; and
     determine whether the first web page is different from the second web page based on the comparison of the one or more attributes of the sensitive data in the first DOM and the second DOM being determined from the comparison as different.

9. The server of claim 8, wherein the processor is configured with processor-executable instructions to perform operations further comprising:
   determining whether the first data item changes across a plurality of web pages, including the first web page, in a first web browsing session of the plurality of web browsing sessions; and
   identifying the first data item as a unique identifier of the first web browsing session in response to determining that the first data item does not change across the plurality of web pages.

10. The server of claim 9, wherein the unique identifier comprises a session identifier, a user identifier, or a role identifier.

11. The server of claim 8, wherein the processor is configured with processor-executable instructions to perform operations further comprising:
    determining whether the first data item matches a predetermined data pattern; and
    identifying the first data item as sensitive data having a static pattern in response to determining the first data item matches a predetermined data pattern.

12. The server of claim 8, wherein the one or more attributes comprise at least one of a location of sensitive data, a type of sensitive data, an adjacency between sensitive data, a distance between sensitive data, and a location of JavaScript acting on the sensitive data.

13. The server of claim 8, wherein the processor is configured with processor-executable instructions such that generating the first DOM for the first web page that represents the sensitive data on the first page comprises generating the first DOM for the first web page that represents the sensitive data and excludes non-sensitive data on the first web page, and
    wherein the second DOM represents sensitive data and excludes non-sensitive data on the second web page.

14. The server of claim 8, wherein the processor is configured with processor-executable instructions to perform operations further comprising, further comprising:
    generating a graph of a plurality of web pages including the first web page and the second web page, wherein each node in the graph represents a web page in the plurality of web pages and each edge in the graph represents navigation links between the plurality of web pages; and
    providing the graph to a system for analysis.

15. A server, comprising:
    means for identifying sensitive data on a first web page of a first user web browsing session, comprising:
      means for selecting a first data item from one or more data items in the first web page;
      means for extracting a location of the first data item in the first web page;
      means for comparing the first data item with same data items on different webpage instances of the same web page browsed during a plurality of web browsing sessions, wherein each of the plurality of web browsing sessions is associated with a different user;

means for determining whether the first data item changes across the plurality of different user web browsing sessions;
means for identifying the first data item as non-sensitive data in response to determining that the first data item does not change across the plurality of web browsing sessions;
means for determining whether the first data item correlates with a session identifier or a user input of each of the plurality of web browsing sessions in response to determining that the first data item changes across the plurality of web browsing sessions; and
means for identifying the first data item as sensitive data having a dynamic pattern in response to determining the first data item correlates with a session identifier or a user input of each of the plurality of web browsing sessions;
means for generating a first document object model (DOM) for the first web page that includes the sensitive data on the first web page and excludes at least some data items that are identified as non-sensitive;
means for comparing one or more attributes of the sensitive data in the first DOM with the one or more attributes of sensitive data in a second DOM for a second web page instance of the same web page from a second user web browsing session of the different web browsing sessions; and
means for determining whether the first web page is different from the second web page based on the comparison of the one or more attributes of the sensitive data in the first DOM and the second DOM being determined from the comparison as different.

16. The server of claim 15, further comprising:
means for determining whether the first data item changes across a plurality of web pages, including the first web page, in a first web browsing session of the plurality of web browsing sessions; and
means for identifying the first data item as a unique identifier of the first web browsing session in response to determining that the first data item does not change across the plurality of web pages.

17. The server of claim 15, wherein means for generating the first DOM for the first web page that represents the sensitive data on the first page comprises means for generate the first DOM that represents the sensitive data and excludes non-sensitive data on the first web page, and
wherein the second DOM represents sensitive data and excludes non-sensitive data on the second web page.

18. The server of claim 15, further comprising:
means for determining whether the first data item matches a predetermined data pattern; and
means for identifying the first data item as sensitive data having a static pattern in response to determining the first data item matches a predetermined data pattern.

19. The server of claim 15, wherein the one or more attributes comprise at least one of a location of sensitive data, a type of sensitive data, an adjacency between sensitive data, a distance between sensitive data, and a location of JavaScript acting on the sensitive data.

20. The server of claim 15, further comprising:
means for generating a graph of a plurality of web pages including the first web page and the second web page, wherein each node in the graph represents a web page in the plurality of web pages and each edge in the graph represents navigation links between the plurality of web pages; and
means for providing the graph to a system for analysis.

21. A non-transitory processor-readable storage medium having stored thereon processor-executable instructions configured to cause a processor of a server to perform operations comprising:
identifying sensitive data on a first web page, wherein identifying sensitive data comprises:
selecting a first data item from one or more data items in the first web page;
extracting a location of the first data item in the first web page;
comparing the first data item with similar data items on web pages browsed during a plurality of web browsing sessions, wherein each of the plurality of web browsing sessions is associated with a different user;
determining whether the first data item changes across the plurality of web browsing sessions;
determining whether the first data item correlates with a session identifier or a user input of each of the plurality of web browsing sessions in response to determining that the first data item changes across the plurality of web browsing sessions; and
identifying the first data item as sensitive data having a dynamic pattern in response to determining the first data item correlates with a session identifier or a user input of each of the plurality of web browsing sessions;
generating a first document object model (DOM) for the first web page that represents the sensitive data on the first web page;
comparing one or more attributes of the sensitive data in the first DOM with the one or more attributes of sensitive data in a second DOM for a second web page; and
determining whether the first web page is different from the second web page based on the comparison of the one or more attributes of the sensitive data in the first DOM and the second DOM.

22. The non-transitory processor-readable storage medium of claim 21, wherein the stored processor-executable instructions are configured to cause the processor of the server to perform operations further comprising:
determining whether the first data item changes across a plurality of web pages, including the first web page, in a first web browsing session of the plurality of web browsing sessions; and
identifying the first data item as a unique identifier of the first web browsing session in response to determining that the first data item does not change across the plurality of web pages.

23. The non-transitory processor-readable storage medium of claim 22, wherein the stored processor-executable instructions are configured to cause the processor of the server to perform operations such that:
generating the first DOM for the first web page that represents the sensitive data on the first page comprises generate the first DOM that represents the sensitive data and excludes non-sensitive data on the first web page; and
the second DOM represents sensitive data and excludes non-sensitive data on the second web page.

24. The non-transitory processor-readable storage medium of claim 21, wherein the stored processor-executable instructions are configured to cause the processor of the server to perform operations further comprising:
determining whether the first data item matches a predetermined data pattern; and identifying the first data item as sensitive data having a static pattern in response to determining the first data item matches a predetermined data pattern.

25. The non-transitory processor-readable storage medium of claim 21, wherein the one or more attributes comprise at least one of a location of sensitive data, a type of sensitive data, an adjacency between sensitive data, a distance between sensitive data, and a location of JavaScript acting on the sensitive data.

26. The non-transitory processor-readable storage medium of claim 21, wherein the stored processor-executable instructions are configured to cause the processor of the server to perform operations further comprising:
- generating a graph of a plurality of web pages including the first web page and the second web page, wherein each node in the graph represents a web page in the plurality of web pages and each edge in the graph represents navigation links between the plurality of web pages; and
- providing the graph to a system for analysis.

\* \* \* \* \*